(12) United States Patent
Stolfus

(10) Patent No.: US 6,771,063 B2
(45) Date of Patent: Aug. 3, 2004

(54) METHODS AND SYSTEMS FOR IMPROVING THE DUTY CYCLE OUTPUT OF A VEHICLE SPEED SENSOR CIRCUIT

(75) Inventor: Joel D. Stolfus, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/999,507

(22) Filed: Nov. 15, 2001

(65) Prior Publication Data

US 2003/0090260 A1 May 15, 2003

(51) Int. Cl.⁷ .................................................. G01P 3/48
(52) U.S. Cl. .................... 324/166; 324/76.48; 324/173; 327/48; 327/175; 340/441
(58) Field of Search ............................... 324/166, 76.48, 324/173–175, 76.47, 207.25; 327/419, 427, 440, 47–49, 172, 175, 102; 123/146.5 R, 406.6, 146.5 A; 340/441, 466, 670, 671; 702/145–148; 361/240; 377/24, 24.1

(56) References Cited

U.S. PATENT DOCUMENTS

| | | | | |
|---|---|---|---|---|
| 3,591,858 A | * | 7/1971 | Boyd ...................... 324/166 X |
| 3,601,707 A | * | 8/1971 | Bauer ...................... 324/166 X |
| 4,031,466 A | * | 6/1977 | Krause et al. ............... 324/175 |
| 4,085,373 A | * | 4/1978 | McConnell ................... 327/48 |
| 5,414,355 A | | 5/1995 | Davidson et al. ........ 324/207.2 |
| 5,444,370 A | | 8/1995 | Wu .......................... 324/207.2 |
| 5,502,376 A | * | 3/1996 | Busch ........................ 324/166 |
| 5,714,016 A | | 2/1998 | Ueda et al. .................. 148/246 |
| 5,729,128 A | | 3/1998 | Bunyet et al. ............... 324/202 |
| 5,731,702 A | * | 3/1998 | Schroeder et al. ...... 324/173 X |
| 5,744,950 A | * | 4/1998 | Seefeldt ....................... 324/166 |
| 5,747,987 A | | 5/1998 | Smith .................... 324/207.13 |
| 5,828,585 A | | 10/1998 | Welk et al. ............. 364/571.01 |
| 5,896,083 A | | 4/1999 | Weisman, II et al. ........ 340/438 |
| 5,898,301 A | | 4/1999 | La Croix et al. ....... 324/207.22 |
| 5,933,005 A | | 8/1999 | Pugh ...................... 324/207.25 |
| 6,134,499 A | | 10/2000 | Goode et al. .................. 701/93 |
| 6,202,021 B1 | | 3/2001 | Kresse et al. .................. 701/93 |
| 6,217,477 B1 | | 4/2001 | Nobumoto et al. ............ 477/43 |
| 6,237,403 B1 | | 5/2001 | Oldenettel et al. ......... 73/146.5 |

* cited by examiner

*Primary Examiner*—N. Le
*Assistant Examiner*—Reena Aurora
(74) *Attorney, Agent, or Firm*—Kris T. Fredrick; Kermit D. Lopez; Luis M. Ortiz

(57) ABSTRACT

A system for improving the duty cycle output of a vehicle speed sensor circuit is disclosed. The vehicle speed sensor circuit can be configured, for example as a binary counter, to provide a particular number of pulses per distance of vehicle travel. An output of the vehicle speed sensor circuit is generally divided by placing varying values on particular load pins of an associated counter circuit, thereby providing a substantially improved duty cycle output from the vehicle speed sensor circuit, which is independent of an associated sensor duty cycle. The output of the vehicle speed sensor circuit can be divided utilizing a toggle flip-flop circuit integrated with the vehicle speed sensor circuit. The toggle flip-flop can be configured as an edge-triggered toggle flip-flop. The vehicle speed sensor can be utilized to sense rotating members present in a vehicle. The vehicle speed sensor thus provides a digital pulse output for every tooth that passes in front of the vehicle speed sensor.

22 Claims, 4 Drawing Sheets

METHODS AND SYSTEMS FOR IMPROVING THE DUTY CYCLE OUTPUT OF A VEHICLE SPEED SENSOR CIRCUIT

TECHNICAL FIELD

The present invention is generally related to vehicle speed sensors. The present invention is also related to automotive applications that utilize vehicle speed sensors to sense gears or other rotating members. The present invention is also related to vehicle speed sensor conditioning circuits. The present invention is additionally related to methods and systems for improving the duty cycle output of vehicle speed sensors utilized in automotive applications.

BACKGROUND OF THE INVENTION

Many modern automotive, marine and other vehicles are equipped with electronic control systems that regulate various components of the vehicle. These electronic control systems are utilized to control the components based on information represented by output signals from various sensors for detecting operating conditions. A vehicle speed sensor is a device, which is generally utilized in an automobile to sense vehicle speed and send this information to the vehicle's onboard computer. In order to control engine performance electronically, it is often necessary to provide a variety of signals to the engine control module. These signals indicate the status of the parameter being detected and to which the control must respond. Among status signals necessary is a signal that is indicative of the vehicle speed.

Transmission-mounted vehicle speed sensors, for example, can be utilized to sense the speed of a vehicle. Transmission manufacturers provide a means of generating a signal, which is proportional to the rate of rotation of the drive shaft. This is accomplished by placing a tone wheel (i.e., a wheel), which has about its circumference lands and valleys that may be of equal width and are generally in line with the power take-off shaft. The signal which is indicative of the vehicle shaft rotation is generated by inserting a vehicle speed sensor into a port opposite the face of the tone wheel until the sensor comes in contact with the face of the tone wheel, then backed off a half turn or to an orientation mark. The gap between the land of the tone wheel and the sensor tip is usually approximately 0.050 (fifty thousandths) of an inch. As the tone wheel rotates, the lands and valleys alternately pass over the sensor head. Each time a land passes, the gap is approximately fifty thousandths of an inch. Each time a valley passes, the gap increases to as much as a quarter of an inch. Those skilled in the art can appreciate that these values are approximations and can vary from application to application. The changes in gap size change the magnetic field concentration between the sensor head and the tone wheel. This change in magnetic field concentration causes a self-induction process to take place within the sensor winding, which in turn causes a voltage to appear at the coil's output leads. This voltage is semi-sinusoidal and the frequency and voltage amplitude is proportional to the rotational speed of the tone wheel.

Also, vehicle speed sensors that use a Hall-effect device as the signal-generating element have been utilized. These have the advantage of generating a signal of uniform amplitude over the entire vehicle speed range. Such a signal may also be configured as a digital output as opposed to a sine type wave, which may be obtained from a VRS (i.e., electromagnetic) sensor. Additional circuitry may be implemented to include an analog or sinusoidal-type input signal that can vary in amplitude. These too were applied as described above. The transducer body contains a Hall-effect sensing element, which is magnetically biased by a permanent magnet mounted in communication with and immediately behind the sensor. The face of the sensing element is approximately 0.015 inches from the end of the sensor body face. As the transducer is screwed into the transducer port of the transmission, it is driven in until it bottoms out against the tone wheel and is then backed off until an orientation mark aligns in line with the tone wheel. Note that some sensors do have a fixed reach air gap designed therein; thus, the aforementioned "bump and back up" process is unnecessary. Note, too, that the sensor may be mounted by means other than forming a hole through which the transducer is screwed. The orientation is important because the Hall-effect sensing element is position sensitive; the orientation is only critical, however, on differential Hall sensors. Some single element Hall sensors are not rotationally sensitive. There are also magnetoresistive types of sensors that can sense gear teeth. For instance, certain types of RF coil proximity sensors can be utilized as gear tooth sensors as well. The resulting gap between the tone wheel and the sensing element is usually less than, for example, 0.050 inches. Other air gap distances, of course, may be achieved; the value 0.050 inches thus represents an illustrative example.

For mechanisms having one portion that rotates relative to another, it is often necessary to know the precise relative rotational position between the two portions. There are many types of sensor arrangements that can accomplish such a task; however, many have drawbacks in that they are too large for a particular application, too expensive to design and fabricate, or require extensive calibration once assembled in the mechanism. These types of sensors can be used, for example, as throttle position sensors, fuel accumulators, transmission position sensors, steering angle sensors, and gear tooth sensors. Many other types of applications of course can also benefit from having rotational position sensing.

Wheel speed detecting components can be based on electromagnetic configurations having excellent environmental resistance. A sensor ring, for example, of a magnetic material having a gear shaped surface of high gear tooth pitch accuracy can be employed for implementation in a speed detecting system. FIG. 1 illustrates a prior art front elevational view of a sensor ring. FIG. 2 depicts a prior art sectional view taken along the line B—B depicted in FIG. 1. Finally, FIG. 3 illustrates an enlarged prior art view illustrating a portion C in FIG. 1. FIG. 4 depicts a diagram generally illustrating a prior art operational principle of electromagnetic wheel speed detection utilizing the sensor ring shown in FIG. 1.

As depicted in FIG. 4, the sensor ring 21 is mounted on a wheel to have a constant clearance between a pole piece 23 of a sensor coil 22 and each tip of the sensor ring 21. The electromagnetic coil 22 receives the magnetic flux change, which is caused in the changing clearance between the coil 22, and the successive tips and grooves of the gear teeth during rotation of the wheel. The coil 22 correspondingly generates an excited output voltage 25 which can be detected to correctly read the speed of each wheel.

Vehicle speed sensors, such as the wheel speed sensor configuration illustrated in FIGS. 1 to 4, are thus utilized in automotive applications to sense gears or other rotating members, such as ring magnets. Such gears are usually located in the vehicle transmission. A vehicle speed sensor thus can provide a digital pulse type output for every gear tooth that passes in front of the sensor.

It is desirable to configure a vehicle speed sensor circuit to provide a certain exact number of pulses per miles of vehicle travel. Because of different transmission gear ratios, wheel sizes, and so forth, it is often necessary to utilize different sensor actuation gears to achieve a correct number of pulses per mile from the vehicle speed sensor. Utilizing different gears in different vehicles increases complexity and cost.

It is also often a requirement of vehicle speed sensor users to obtain an output duty cycle at or very near a fifty-percent (50%) duty cycle. This is difficult to achieve because the sensor output duty cycle is dependent on many variables, the largest of which is the sensor-to-target air gap. The sensor-to-target air gap is difficult to control in the vehicle.

The present inventor has thus concluded, based on the foregoing, that a need exists for an improved vehicle speed sensor circuit, which would improve the output duty cycle at or very near a 50% duty cycle. The invention disclosed herein addresses this need by providing an improved vehicle speed sensor conditioning circuit, including methods and systems thereof.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved vehicle speed sensor.

It is another aspect of the present invention to provide improved methods and systems for implementing vehicle speed sensors in automotive applications in order to sense gears or other rotating members.

It is also an aspect of the present invention to provide a vehicle speed sensor conditioning circuit.

It is yet another aspect of the present invention to provide methods and systems for improving the duty cycle output of vehicle speed sensors utilized in automotive applications.

The above and other aspects are achieved as is now described. Methods and systems for improving the duty cycle output of a vehicle speed sensor circuit are disclosed. The vehicle speed sensor circuit can be configured to provide a particular number of pulses per distance of vehicle travel. An output of the vehicle speed sensor circuit is generally divided by placing varying values on particular load pins of an associated counter circuit, thereby providing a substantially improved duty cycle output from the vehicle speed sensor circuit, which is independent of an associated sensor duty cycle. The particular load pins can be parallel load pins. The associated counter circuit can be configured as a binary counter. The output of the vehicle speed sensor circuit can be divided utilizing a toggle flip-flop circuit integrated with the vehicle speed sensor circuit. The toggle flip-flop can be configured as an edge-triggered toggle flip-flop, which can trigger on negative edges, such that negative edge spacing is independent of a sensor air gap associated with the vehicle speed sensor circuit, thereby achieving a duty cycle output from the vehicle speed sensor circuit that functions constantly at an approximately fifty-percent duty cycle. The vehicle speed sensor can be utilized to sense rotating members present in a vehicle. The rotating members may form gears, such that the gears are configured to include gear teeth. The vehicle speed sensor thus provides a digital pulse output for every tooth that passes in front of the vehicle speed sensor. The vehicle itself may be, for example, an automobile.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 6 illustrates a flow chart of operations illustrative of logical operational steps, which may be followed to implement a vehicle speed sensor conditioning circuit, in accordance with a preferred embodiment of the

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 3:
FIG. 3 depicts an enlarged view of a prior art gear for wheel speed detection.
Figure 1:
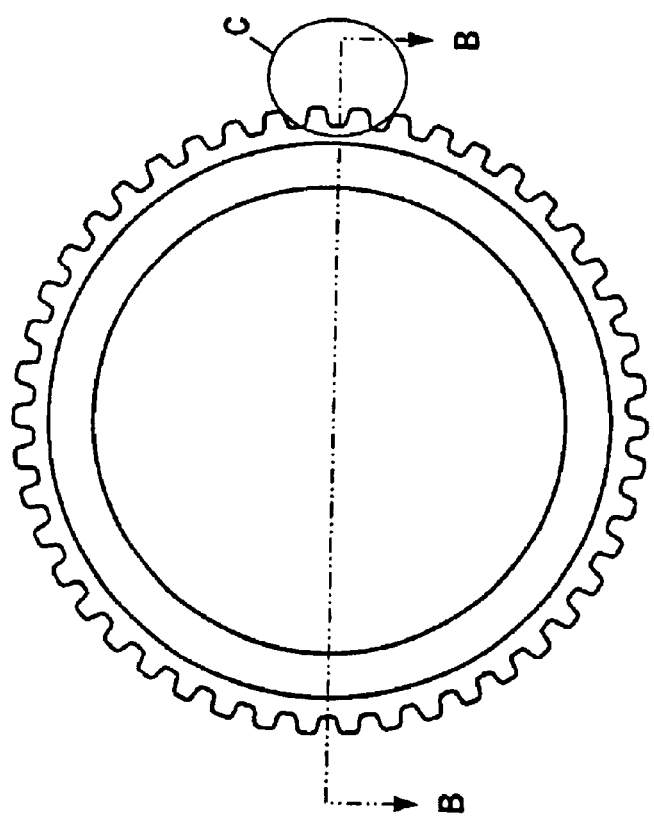
FIG. 1 depicts a front elevational view of a prior art gear for vehicle speed detection.
Figure 2:
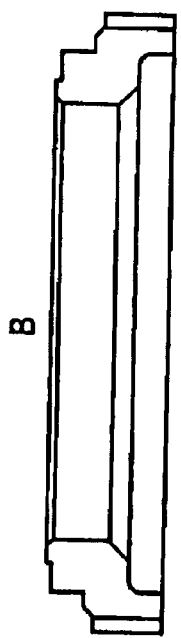
FIG. 2 illustrates a sectional view of a prior art gear for vehicle speed detection.
Figure 4:
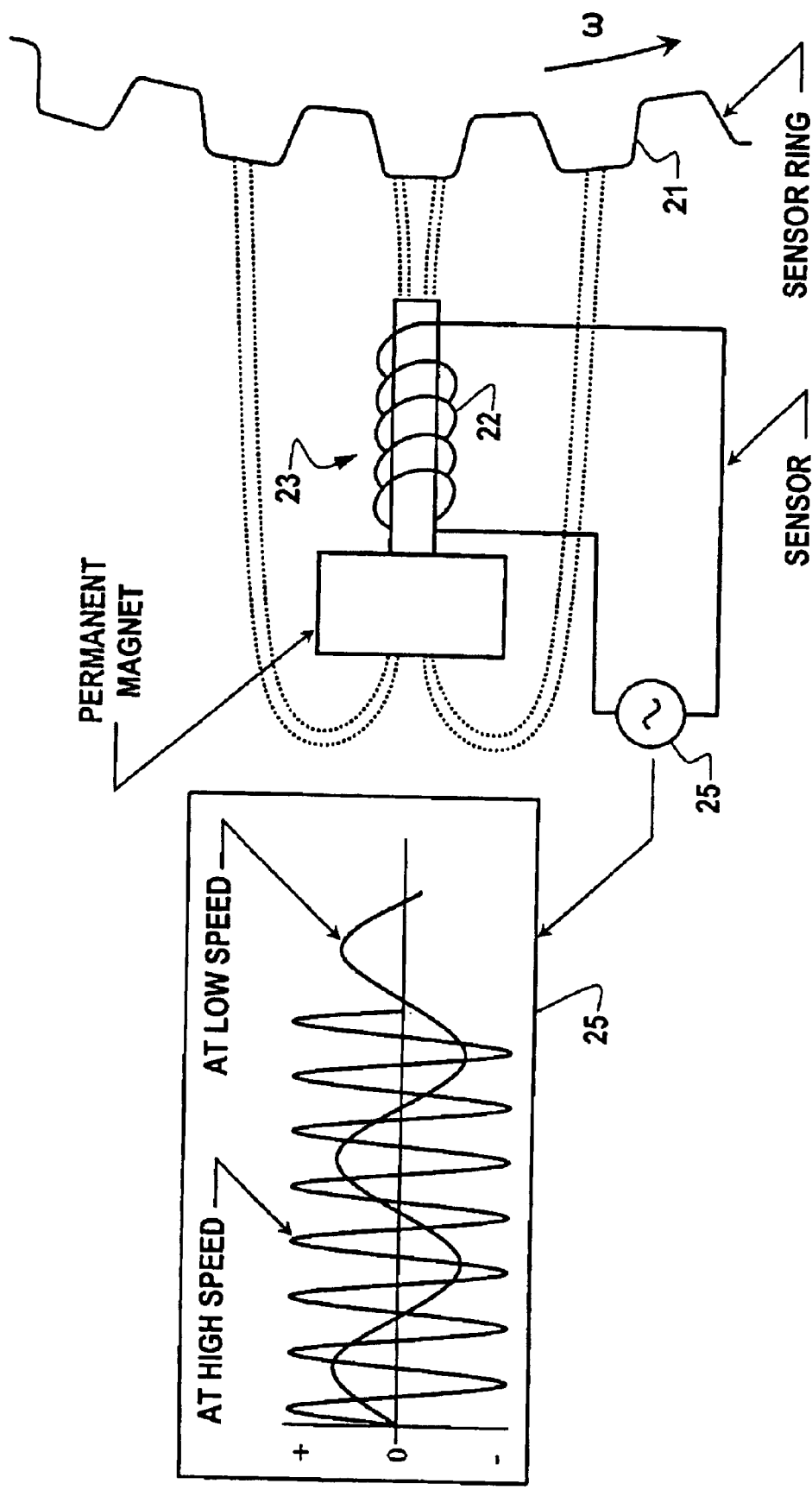
FIG. 4 illustrates prior art operational principles of electromagnetic wheel speed detection utilizing the configuration depicted in FIGS. 1, 2, and 3.
Figure 5:
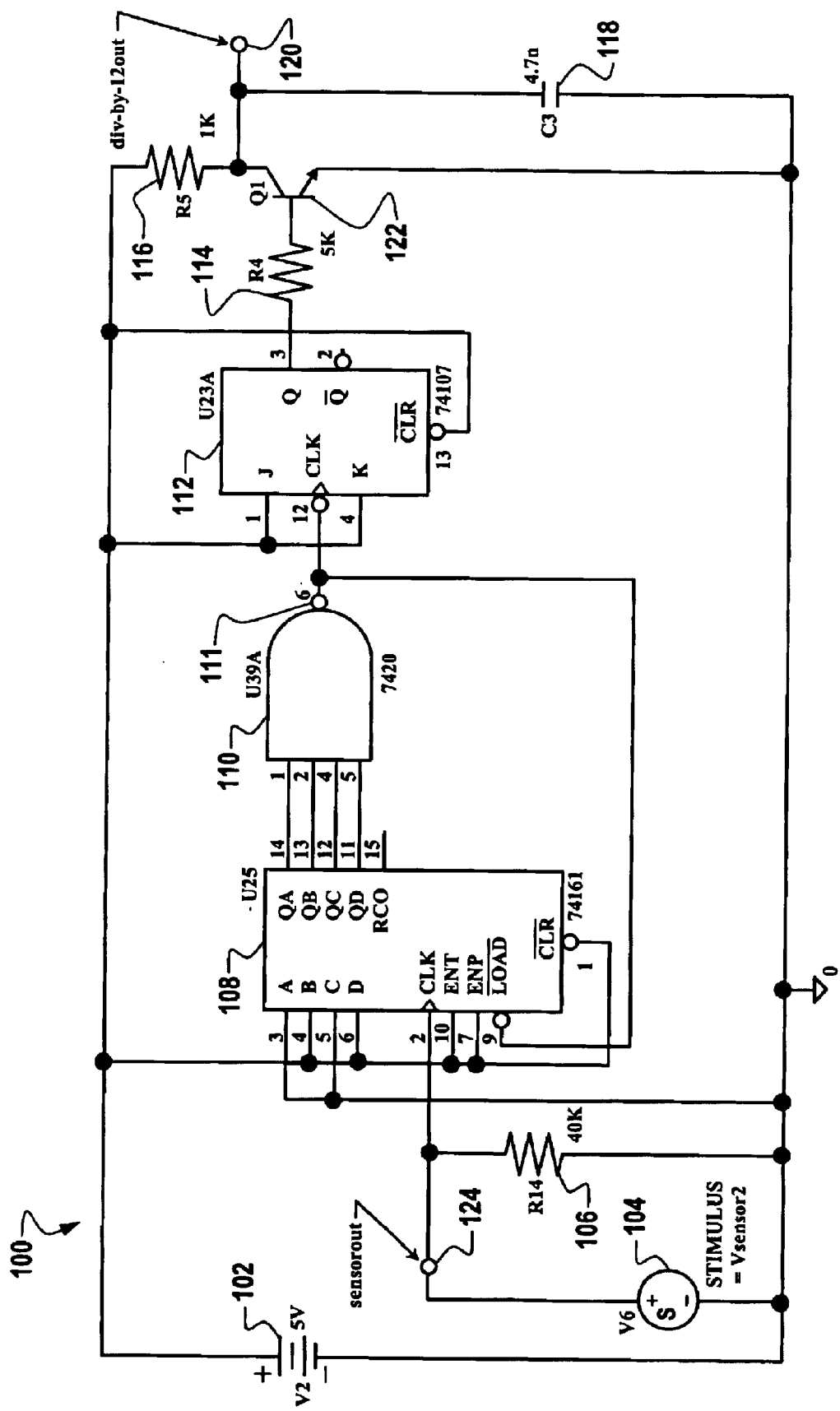
FIG. 5 depicts a vehicle speed sensor conditioning circuit, in accordance with a preferred embodiment of the present invention.

FIG. 5 depicts a vehicle speed sensor conditioning circuit 100, in accordance with a preferred embodiment of the present invention. Circuit 100 is supplied by a voltage source 102, which is linked to a resistor 116, a transistor 122, a binary counter 112, and an edge-triggered flip-flop, which is configured from a NAND gate 110 and circuit 108. Such an edge-triggered flip-flop is essentially a circuit that alternates between two possible states when a pulse is received at an input. For example, if the output of a flip-flop is high, a pulse is received at the input, the output "flips" to low. Thereafter, a second input pulse "flops" the output back to high, and so forth. In general, the flip-flop can be utilized to set the duty cycle at 50%. The binary counter 112 can be added to circuit 100 to permit different pulse counts per target rotation. Utilizing only the flip-flop results in a division of the output by a value of 2. Circuit 100, on the other hand, can accomplish both of the aforementioned functions.

Circuit 108 can be configured to include a variety of inputs 3, 4, 5, 6 also labeled respectively as A, B, C, and D. Outputs from circuit 108 are indicated at pins 14, 13, 12, 11, and 15. These outputs are respectively labeled as QA, QB, QC, QD and RCO. Outputs 14, 13, 12, and 11 are respectively input to NAND gate 110 as indicated at pins 1, 2, 4, and 5. An output 111 (i.e., see pin 6) from NAND gate 110 is fed as input to binary counter 112 as indicated at pin 12 (i.e., a clock "CLK" input). Additionally, output 111 from NAND gate 110 is fed into a LOAD input of circuit 108, as indicated at pin 9. Additionally, a clear "CLR" input is indicated at pin 1, an ENP input at pin 7, an ENT input at pin 10, and a clock input at pin 2 of circuit 108. A stimulus voltage input 104 is placed in parallel with a resistor 106.

An output 124 (i.e., "sensor out") is connected to a clock input at pin 2 of circuit 108. Resistor 106 of circuit 100 can have a value of, for example, 10 k. Resistor 106 is labeled "R14" in FIG. 5. Additionally, a resistor 114 can be connected to an input of transistor 122, which is also connected to a resistor 116. Resistor 114, which is labeled "R4", can have a value of, for example, 5 k. Resistor 116 can be configured with a value of, for example, 1 k. Resistor 116 is labeled "R5" in FIG. 5. Transistor 122 can be connected in parallel with a capacitor 118 (also labeled as C3), which can have a value of, for example, 4.7 nF. Transistor 122 of circuit 100 is also indicated as "Q1". Additionally resistor 114 can be connected to a pin 3 (i.e., labeled Q) of binary circuit 112. Also, as indicated in FIG. 5, pins 1 and 4 (i.e., "J" and "K"), along with pin 13, of binary circuit 112 are coupled to voltage supply 102. Resistor 116 (i.e., R5) is coupled between output or node 120 and voltage supply 102. Voltage supply 102 is essentially located in parallel with resistor 116 and transistor 122. Resistor 116 and transistor 122 are located in series with one another but together in parallel with voltage supply 102.

Circuit 100 thus illustrates one example of a vehicle speed sensor conditioning circuit, which may be implemented in accordance with the methods and systems of the present invention. In the illustrative example circuit 100 of FIG. 5, circuit 100 functions to divide a sensor output by 12, as indicated at output 120. Circuit 100 can thus be utilized to improve the duty cycle output of a vehicle speed sensor circuit. Circuit 100 is generally configured to provide a particular number of pulses per distance of vehicle travel. An output of the vehicle speed sensor circuit (i.e., circuit 100) is generally divided by placing varying values on particular load pins of binary counter 112, thereby providing a substantially improved duty cycle output 120 from the vehicle speed sensor circuit, which is independent of an associated sensor duty cycle. The particular load pins can comprise parallel load pins.

The output 120 of the vehicle speed sensor circuit (i.e., circuit 100) can be divided utilizing a toggle flip-flop circuit (i.e., 108 and 111) integrated with the vehicle speed sensor circuit. The toggle flip-flop can be configured as an edge-triggered toggle flip-flop, which can trigger on negative edges, such that negative edge spacing is independent of a sensor air gap associated with the vehicle speed sensor circuit, thereby achieving a duty cycle output from the vehicle speed sensor circuit that functions constantly at an approximately 50% duty cycle. The vehicle speed sensor can be utilized to sense rotating members present in a vehicle. The rotating members may form gears, such that the gears are configured to include gear teeth. The vehicle speed sensor thus provides a digital pulse output for every tooth that passes in front of the vehicle speed sensor.

Figure 6:
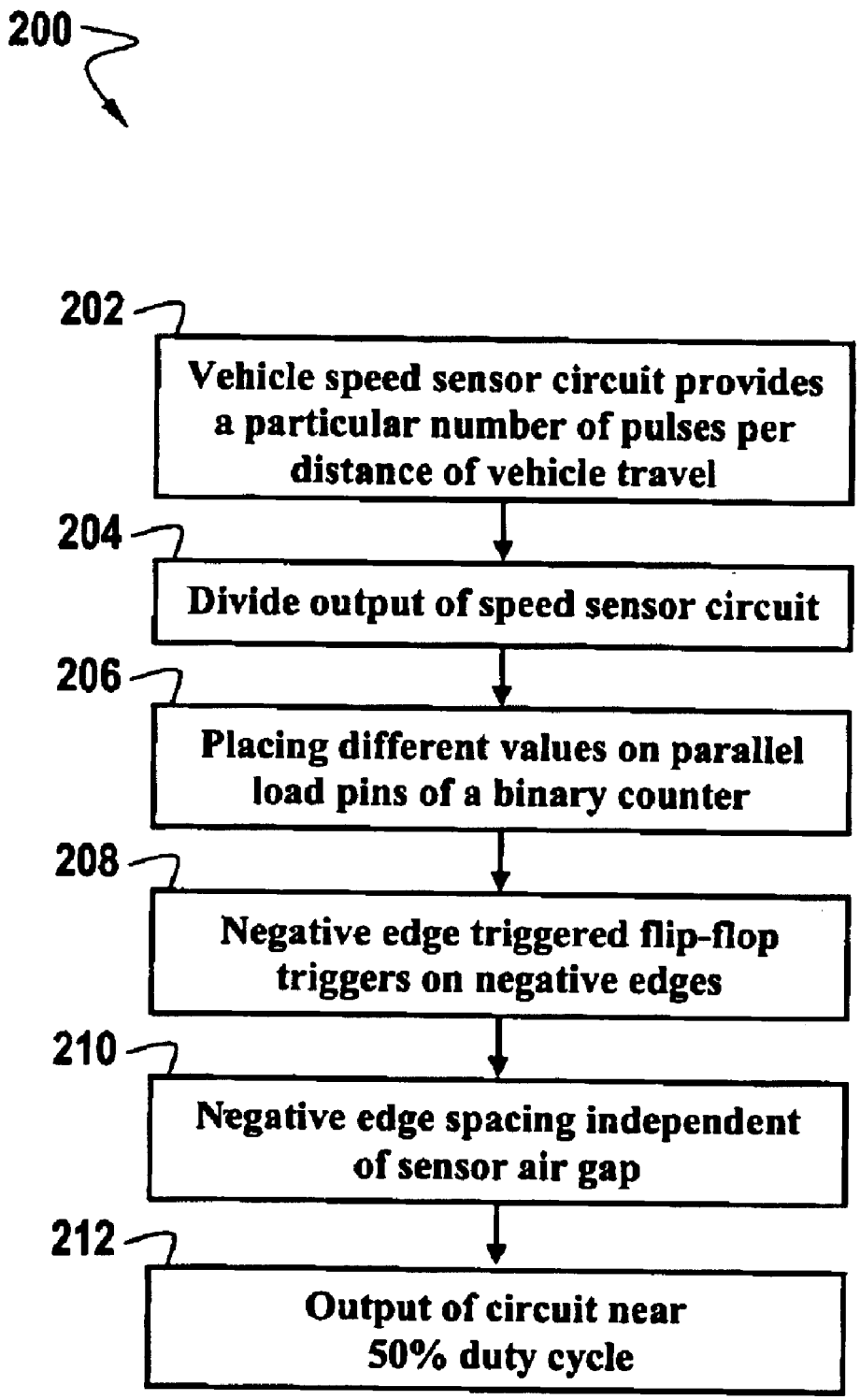

FIG. 6 depicts a flow chart of operations 200 illustrative of logical operational steps, which are followed to implement a vehicle speed sensor conditioning circuit, in accordance with a preferred embodiment of the present invention. As illustrated at block 202, a vehicle speed sensor circuit implemented in accordance with the methods and systems of the present invention can provide a particular number pulses per distance (e.g., miles) of vehicle travel. An example of such a vehicle speed sensor circuit is illustrated as circuit 100 in FIG. 5. As indicated next at block 204, the vehicle speed sensor circuit (e.g., circuit 100) is configured, such that the output of the speed sensor is divided by a particular value (e.g., a value of 12, 12.2, etc.). Thereafter, as illustrated at block 206, different values are placed on parallel load pins of a binary counter (e.g., binary counter 112 of FIG. 5). The operation illustrated at block 206 thus permits sensor output to be divided by placing different values on the parallel load pins. As indicated next at block 208, a negative-edge triggered toggle flip-flop is utilized to trigger on negative edges. Negative-edge spacing is thus independent of a sensor air gap, as indicated at block 210. The output of the circuit (e.g., circuit 100 of FIG. 5) is thus near 50% duty cycle as indicated at block 212.

It can be appreciated, based on the foregoing description that examples of voltage values that can be placed on the counter 112 are provided by voltages 102 and 104 (mitigated by resistor 106, block 108 and NAND gate 11). Counter 112 of FIG. 5 includes three parallel pins J, CLK and K as input to counter 112. A voltage source 102 (i.e. V2) is also indicated in FIG. 5, along with a voltage stimulus 104 (i.e. V6). Voltage source 102 provides at least a voltage of 5V, which can be input to pins J and K. Additionally, a CLK (i.e., a clock) input CLK pin is also provided as an input (i.e. one of the parallel input pins J, CLK and K) to counter 112. CLK is thus a clock input, and thus will not have the same input voltage as pins J and K, because the input to CLK is provided from NAND gate 110. NAND gate 110 is connected to block 108, which is further connected to voltage stimulus 104. It is thus clear that the voltage provided to pin CLK of counter 112 via block 108 and NAND gate 110 from stimulus voltage 104 provides a "different" voltage than that provided by voltage 102 to pins J and K, which are parallel pins in parallel with pin CLK of counter 112.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows.

Having thus described the invention what is claimed is:

1. A vehicle speed sensing system, comprising:
   a vehicle speed sensor circuit configured to provide at least one digital pulse output for every geartooth of a plurality of gearteeth thereof that passes by said vehicle speed sensor circuit;
   a counter circuit having a plurality of load pins, wherein said counter circuit is integrated with said vehicle speed sensor circuit, such that an output of said vehicle speed sensor circuit is divided by placing varying voltage values on at least one load pin of said plurality of load pins of said counter circuit; and
   at least two voltage sources that provide said varying voltage values, wherein said at least two voltage sources include at least one stimulus voltage source, which provides a substantially improved duty cycle output from said vehicle speed sensor circuit that is independent of an associated sensor duty cycle.

2. The system of claim 1 wherein said at least one load pin comprises at least one parallel load pin.

3. The system of claim 1 wherein said counter circuit comprises a binary counter.

4. The system of claim 1 wherein said output of said vehicle speed sensor circuit is divided utilizing a toggle flip-flop circuit integrated with said vehicle speed sensor circuit.

5. The system of claim 4 wherein said toggle flip-flop comprises an edge-triggered toggle flip-flop, wherein said edge-triggered flip-flop circuit comprises an output coupled to a resistor connected to a transistor in parallel with at least one capacitor.

6. The system of claim 4 wherein said edge-triggered toggle flip-flop triggers on negative edges, such that negative-edge spacing is independent of a sensor air gap associated with said vehicle speed sensor circuit, thereby achieving a duty cycle output from said vehicle speed sensor circuit that functions constantly at an approximately 50% duty cycle.

7. The system of claim 6 wherein said rotating members comprise gears, such that said gears are configured to include a plurality of gear teeth.

8. The system of claim 6 wherein said vehicle speed sensor circuit provides a digital pulse output for every tooth of said plurality of gear teeth that pass in front of said vehicle speed sensor.

9. The system of claim 1 wherein said vehicle speed sensor senses rotating members present in a vehicle.

10. A vehicle speed sensing system, comprising:
    a vehicle speed sensor circuit configured to provide a plurality of digital of pulses per distance of vehicle travel; and
    a binary counter integrated with said vehicle speed sensor circuit;
    a flip-flop circuit integrated with said vehicle speed sensor circuit, wherein said flip-flop circuit divides an output of said vehicle speed sensor circuit by placing varying voltage values on parallel load pins of said binary counter, wherein said varying voltage values are provided originally by at least two voltage sources, wherein said at least two voltage sources include a stimulus voltage source thereby providing a substantially improved duty cycle output from said vehicle speed sensor circuit, wherein said improved duty cycle output is independent of an associated sensor duty cycle.

11. The system of claim 10 wherein said flip-flop circuit comprises a toggle flip-flop.

12. The system of claim 10 wherein said flip-flop circuit comprises an edge-triggered flip-flop.

13. The system of claim 12 wherein said edge-triggered flip flop comprises a NAND gate whose inputs are connected to outputs at a circuit having a clock input connected to said stimulus voltage source.

14. The system of claim 13 wherein said stimulus voltage source is located in parallel with a resistor that is also connected to said clock input.

15. The system of claim 12 wherein said edge-triggered flip-flop triggers on negative edges, such that negative edge spacing is independent of a sensor air gap associated with said vehicle speed sensor circuit.

16. A vehicle speed sensing system, comprising:
    a plurality of voltage sources including a first voltage source and a second voltage source, wherein said second voltage source comprises a stimulus voltage source in parallel with a first resistor;
    a flip-flop circuit connected to a counter circuit, wherein said flip-flop circuit alternates between two possible states when a pulse is received at an input of said flip-flop circuit and wherein said counter circuit permits varying pulse counts per target rotation;
    a plurality or resistors comprising a second resistor and a third resistor wherein said second resistor and said third resistor are connected to a transistor having an output node connected to said first resistor, said first voltage source, said second voltage source and an input of said flip-flop circuit, wherein said output node comprises an output of said vehicle speed sensing system which is independent of sensor duty cycles of said vehicle speed sensing system.

17. The system of claim 16 wherein said flip-flop circuit comprises an edge-triggered flip-flop.

18. The system of claim 17 wherein said edge-triggered toggle flip-flop triggers on negative edges, such that negative edge spacing is independent of a sensor air gap associated with said vehicle speed sensing system, thereby achieving a duty cycle output from said vehicle speed sensor system that functions constantly at an approximately 50% duty cycle.

19. The system of claim 16 wherein:
    a first end of said second resistor is connected to an output of said counter circuit and a second end of said second resistor is connected to said transistor at said output node; and
    wherein a capacitor is located in parallel with said transistor, such that a first end of said capacitor is connected to said output node.

20. The system of claim 16 wherein said counter circuit comprises a binary counter having at least one input provided by an output of said flip-flop circuit.

21. The system of claim 16 wherein said counter circuit comprises a plurality of load pins, wherein an output signal from said output node is divided by placing varying voltage values on said plurality of load pins, wherein said varying voltage values are provided originally by said first and second voltage sources to provide an improved duty cycle output from said vehicle speed sensor circuit, which is independent of an associated sensor duty cycle.

22. The system of claim 21 wherein said plurality of load pines comprise parallel load pins.

* * * * *